US006596959B2

(12) United States Patent
Sichtermann et al.

(10) Patent No.: US 6,596,959 B2
(45) Date of Patent: Jul. 22, 2003

(54) METHOD OF MANUFACTURING A WELDING STUD

(75) Inventors: Kay Sichtermann, Herdecke (DE); Klaus E. Jost, Hagen (DE)

(73) Assignee: Nelson Stud Welding, Inc., Elyria, OH (US)

( * ) Notice: Subject to any disclaimer, the term of this patent is extended or adjusted under 35 U.S.C. 154(b) by 0 days.

(21) Appl. No.: 09/813,726

(22) Filed: Mar. 21, 2001

(65) Prior Publication Data

US 2002/0030037 A1 Mar. 14, 2002

(51) Int. Cl.⁷ .................. B23K 11/04; B23K 9/00
(52) U.S. Cl. ......................... 219/98; 219/78.01
(58) Field of Search ................. 219/98, 78.01; 439/92, 801

(56) References Cited

U.S. PATENT DOCUMENTS

| | | | | | |
|---|---|---|---|---|---|
| 3,010,011 A | * | 11/1961 | Darlington, Jr. | ............ | 219/107 |
| 3,114,031 A | * | 12/1963 | Dash | ............ | 219/99 |
| 3,182,173 A | * | 5/1965 | Dash | ............ | 219/99 |
| 6,077,096 A | * | 6/2000 | Moring et al. | ............ | 439/92 |

FOREIGN PATENT DOCUMENTS

| | | |
|---|---|---|
| DE | 1013145 | 8/1957 |
| DE | 2620449 | 11/1976 |
| DE | 4327647 | 2/1995 |

OTHER PUBLICATIONS

ASM Handbook, Glossary of Metallurgical Terms and Engineering tables, 1979, p. 70.*
Repetitorium Des Ingenieurwissens, Werkstoffkunde und Werkstoffprüfung by Prof. Dr.—Ing. Wilhelm Domke, 6., überarbeitete Auflage; Jan., 1976; Verlag W. Girardet • Essen ©1964, 1966, 1969 1971, 1973 and 1975 no translation.

* cited by examiner

*Primary Examiner*—M. Alexandra Elve
(74) *Attorney, Agent, or Firm*—Howard & Howard

(57) ABSTRACT

The invention relates to a method of manufacturing a welding stud from a wire by cold-working and by hardening and tempering. The welding stud particularly serves to be welded to a workpiece by means of an electric stud welding method and consists of a mounting portion and a welding portion. According to the invention, the wire is first pretreated by hardening and tempering and is then cold-worked in such a way that the mounting portion and the welding portion have different strengths.

17 Claims, 1 Drawing Sheet

METHOD OF MANUFACTURING A WELDING STUD

FIELD OF THE INVENTION

The invention relates to a method of manufacturing a welding stud from a wire by cold-working and by hardening and tempering, wherein the welding stud particularly serves to be welded to a workpiece by means of an electric stud welding method and consists of a mounting portion and a welding portion.

BACKGROUND OF THE INVENTION

The present application claims priority to German Patent Application No. 100 14 078.5-14 filed Mar. 22, 2000.

The prior art already includes welding studs of this kind which, after they have been welded to a workpiece, serve for mounting or attaching objects, which purpose is fulfilled by the mounting portion of the welding stud.

Thus, this mounting portion has to have a higher strength than that of the welding portion.

The generally known prior art includes what is referred to as "duo-threaded studs", which consist of two different materials in order to meet the above-mentioned requirements. Because of the different materials, it is time-consuming and expensive to manufacture these welding studs.

Furthermore, it is known to manufacture welding studs in such a way that the starting material, e.g. a wire, is first cold-worked and the welding stud thus manufactured is then hardened and tempered. This hardening and tempering is prescribed in standards for some property classes (relating to strength), e.g. property class 8.8.

As a result of hardening and tempering, however, high hardness peaks are disadvantageously created in the welding portion. Furthermore, a high welding current is required, which disadvantageously leads to spatter formation and thus to an uneven welding surface.

Accordingly, the object of the present invention is to provide a welding stud and a method of manufacturing the same with which the above-mentioned disadvantages are avoided and which makes a cost-efficient manufacture of the welding stud, which has a simple structure, possible.

SUMMARY OF THE INVENTION

According to the invention, this object is achieved by previously hardening and tempering the wire and subsequently cold-working it in such a way that the mounting portion and the welding portion have different strengths. This leads to the advantage that hardening and tempering is not effected on the stud itself but on the starting material. With the combination of the hardened and tempered starting material and the subsequent cold-working, the prescribed or desired property class (e.g. 8.8) is easily achieved.

In a further embodiment of the invention, as a result of cold-working, the mounting portion has a higher strength than the welding portion. Here, the diameter of the wire is reduced to a greater extent in the area of the mounting portion than in the area of the welding portion. Preferably, the reduction of the diameter of the wire may range from 40 to 60% in the area of the mounting portion and from 15 to 25% in the area of the welding portion. As starting material, a wire made of a hardened and tempered material, e.g. steel (St.37-3, 1.4301, 1.4571), may be used.

Alternatively, in a welding stud, particularly for welding to a workpiece by means of an electric stud welding method, comprising a welding portion and a stud end to be welded to the workpiece and a mounting portion for connection with an object. The invention proposes to manufacture the two portions consisting of the same material by cold-working, after the starring material has been pre-treated by hardening and tempering, in such a way that the portions have different strengths, preferably in such a way that the mounting portion has a higher strength than the welding portion. Alternatively, the starting material may be non-heat treated, microalloyed materials.

BRIEF DESCRIPTION OF THE DRAWINGS

Advantageous embodiments are apparent from the sub-claims. In the following, the invention is described in greater detail with the aid of embodiments illustrated in the drawings, in which:

DETAILED DESCRIPTION OF A PREFERRED EMBODIMENT

Figure 1:
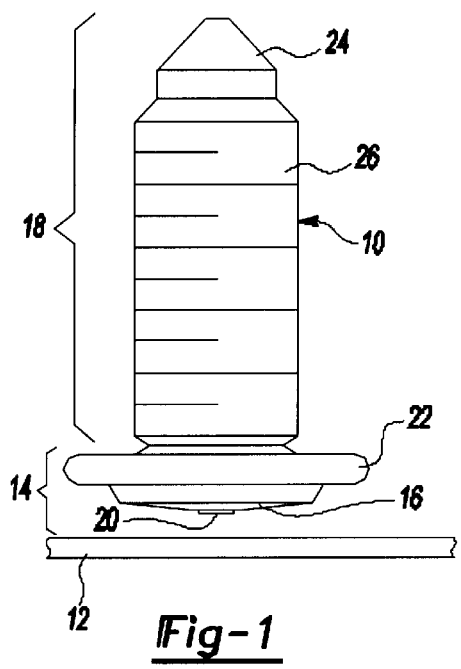
FIG. 1 shows a first embodiment of a welding stud according to the invention be-fore it is welded.
Figure 2:
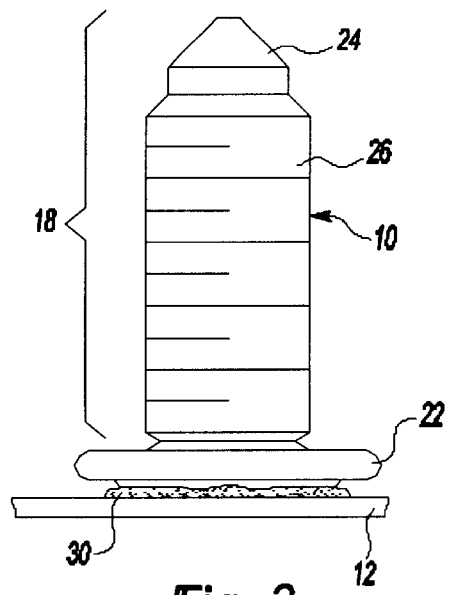
FIG. 2 shows the welding stud according to FIG. 1 after it has been welded.

In the first embodiment according to FIGS. 1 and 2, a welding stud 10 is used which consists of a welding portion 14 and a mounting portion 18. The welding portion 14 comprises a stud end 16 provided with a welding tip 20. This welding tip 20 may e.g. be configured to be conical.

The mounting portion 18 may e.g. comprise a thread portion 26 which verges into a conical end 24 at the face thereof.

The method of manufacturing a welding stud 10 of this kind is configured such that an existing wire used as the starting material is first pre-treated by hardening and tempering and is then cold-worked in such a way that the form illustrated in FIG. 1 with the welding portion 14 and the mounting portion 18 is obtained. As a result of cold-working, the mounting portion 18 has a higher strength than the welding portion 14. Alternatively, the existing wire may be non-heat treated, microalloyed material.

In order to obtain this higher strength, the diameter of the wire is reduced to a greater extent in the area of the mounting portion 18 than in the area of the welding portion 14. For example, the reduction of the diameter of the wire may range from 40 to 60% in the area of the mounting portion 18 and from 15 to 25% in the area of the welding portion 14.

As the starting material, the wire may consist of a hardened and tempered material, particularly of steel, e.g. St. 37-3, 1.4301 or 1.4571. As shown in FIG. 2, after the stud 10 has been welded to a workpiece 12, a uniform welding surface 30 is obtained whose cross-section is larger than the cross-section of the mounting portion 18. Advantageously, the welding stud 10 according to the invention is configured such that the mounting portion 18, i.e. the thread 26, meets the demands of a high property class (e.g. 8.8) without impairing the welding operation when the welding stud 10 is attached to the workpiece 12.

In the embodiment of the welding stud 10 shown in FIGS. 1 and 2, a flange 22 is arranged between the welding portion 14 and the mounting portion 18.

Figure 3:
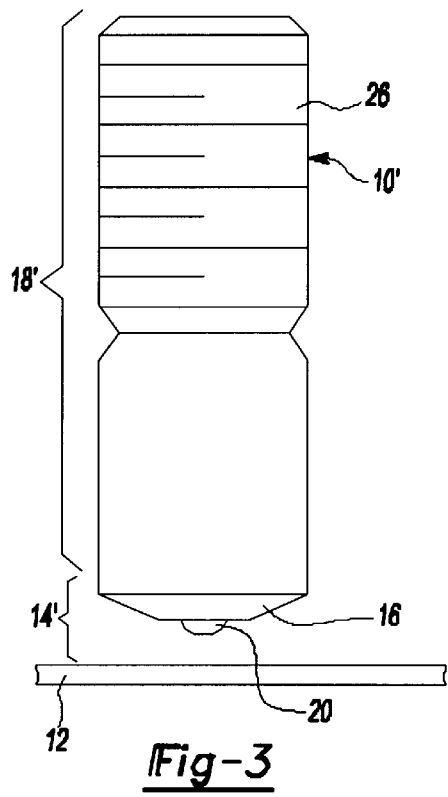
FIG. 3 shows another embodiment of the invention before welding.
Figure 4:
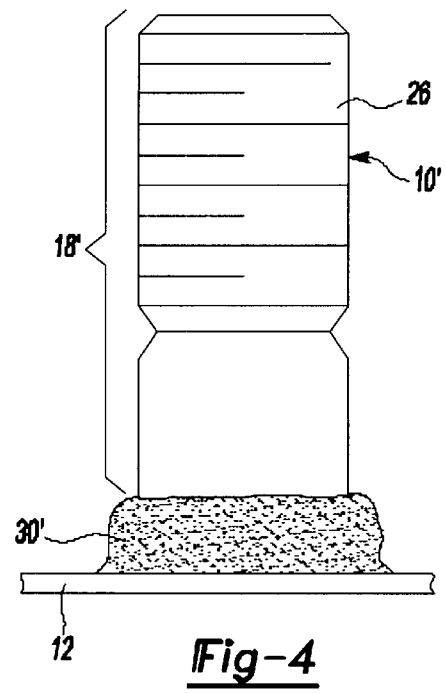
FIG. 4 shows the welding stud according to FIG. 3 after welding.

In the embodiment shown in FIGS. 3 and 4, the welding stud 10' does not complise a flange 22 of this kind. In this case, however, a welding portion 14' and a mounting portion 18' are provided, with the welding portion 14' comprising a stud end 16 with a welding tip 20 which may e.g. be hemispherical.

Here, too, the starting material is a wire which is first pre-treated by hardening and tempering and is then cold-worked in such a way that the mounting portion 18' has a higher strength than the welding portion 14'. Analogous to the above-mentioned embodiment according to FIGS. 1 and 2, as a result of cold-working, the diameter of the wire is reduced to a greater extent in the area of the mounting portion 18 than the diameter of the wire in the area of the welding portion 14'. Here, too, the mounting portion 18' may be provided with a thread 26 or may 10 have a different design; in any case, it must be guaranteed that the diameter of the wire is reduced to a greater extent in the area of the mounting portion 18' by cold-working than the diameter of the wire in the area of the welding portion 14'. The mounting portion 18' may be provided with the thread 26 by approximately ⅗, which serves to attach an object that is not shown in greater detail to the welding stud 10', which is connected with the workpiece 12 via the weld 30'.

The welding studs 10 or 10' according to the invention are particularly suitable for short-time stud welding with stroke ignition and for stroke ignition stud welding using a ceramic ring or inert gas in accordance with the standards DIN EN ISO 13918 and DIN EN ISO 14555.

The invention makes it possible to manufacture welding studs 10 or 10' for the welding methods mentioned, comprising a welding portion 14 or 14' whose strength is below the property class to be guaranteed in the mounting portion 18 or 18', e.g. property class 8.8. These welding studs according to the invention meet the requirements for a hardened and tempered welding stud, as the diameter of the welding portion 14 or 14' is dimensioned to be substantially larger than the mounting portion 18 or 18'. The total stability under load of the welding stud 10 or 10' of the property class mentioned before is achieved by the fact that the welding portion 14, 14' has a larger load-carrying cross-section than the mounting portion 18, 18'.

The welding stud 10 or 10' according to the invention is manufactured from the same basic material in its entirety. Furthermore, the following advantages are obtained:

hardness peaks in the welding portion are reduced, thus leading to more ductile behavior;

less welding current is necessary compared to a stud that is hardened and tempered in its entirety (e.g. property class 8.8);

the welding portion or the welding tip (20, 20') are burned off uniformly; a uniform welding surface is formed;

spatter formation is less probable;

studs whose surface is coated (i.e. with zinc) are easier to weld;

the weld joint is capable of carrying higher loads (thrust load and torsion); higher processing reliability.

Thus, by using the welding stud 10 or 10' according to the invention, it is possible to combine the advantages of a hardened and tempered stud, in particular a high strength and a high tightening torque, with the advantages of a welding stud having a higher toughness, namely, improved weldability and uniform weld formation.

What is claimed is:

1. A welding stud capable of being welded to a workpiece by an electric stud welding machine comprising:
    a welding portion having a welding surface adapted to be welded to the workpiece;
    a mounting portion extending away from said welding surface; and
    said welding stud being formed from a single wire and said mounting portion being cold formed wherein said mounting portion has a higher hardness than said welding portion.

2. A welding stud as set forth in claim 1 wherein said mounting portion has a smaller diameter than said welding portion.

3. A welding stud as set forth in claim 1 wherein said welding stud has a flange portion disposed between said welding portion and said mounting portion.

4. A welding stud as set forth in claim 1 wherein said mounting portion has a helical rib forming a threaded surface thereon.

5. A welding stud as set forth in claim 1 wherein said welding portion has a conical welding surface.

6. A welding stud as set forth in claim 1 wherein said welding portion comprises a hemispherical welding surface.

7. A welding stud as set forth in claim 1 comprising a heat tempered steel.

8. A welding stud as set forth in claim 1 comprising a non-heat treated, microalloyed steel.

9. A welding stud capable of being welded to a workpiece by an electric stud welding machine comprising:
    a welding portion having a welding surface adapted to be welded to the workpiece;
    a mounting portion extending away from said welding surface; and
    wherein said mounting portion and said welding portion are formed from a single wire by cold forming providing said mounting portion with a higher tensile strength than said welding portion.

10. A welding stud as set forth in claim 9 wherein said mounting portion has a higher hardness than a hardness of said welding portion.

11. A welding stud as set forth in claim 9 wherein said mounting portion has a smaller diameter than said welding portion.

12. A welding stud as set forth in claim 9 including a flange disposed between said welding portion and said mounting portion.

13. A welding stud as set forth in claim 9 wherein said mounting portion has a helical rib forming a threaded surface thereon.

14. A welding stud as set forth in claim 9 wherein said welding portion comprises a conical welding surface.

15. A welding stud as set forth in claim 9 wherein said welding portion comprises a hemispherical welding surface.

16. A welding stud as set forth in claim 9 composing a heat tempered steel.

17. A welding stud as set forth in claim 9 comprising a non-heat treated, microalloyed steel.

* * * * *

UNITED STATES PATENT AND TRADEMARK OFFICE
CERTIFICATE OF CORRECTION

PATENT NO.     : 6,596,959 B2
DATED          : July 22, 2003
INVENTOR(S)    : Kay Sichtermann and Klaus E. Jost It is certified that error appears in the above-identified patent and that said Letters Patent is hereby corrected as shown below:

Column 4,
Line 58, delete "composing" and insert -- comprising --.

Signed and Sealed this

Thirtieth Day of September, 2003

JAMES E. ROGAN
*Director of the United States Patent and Trademark Office*